Patented Apr. 8, 1941

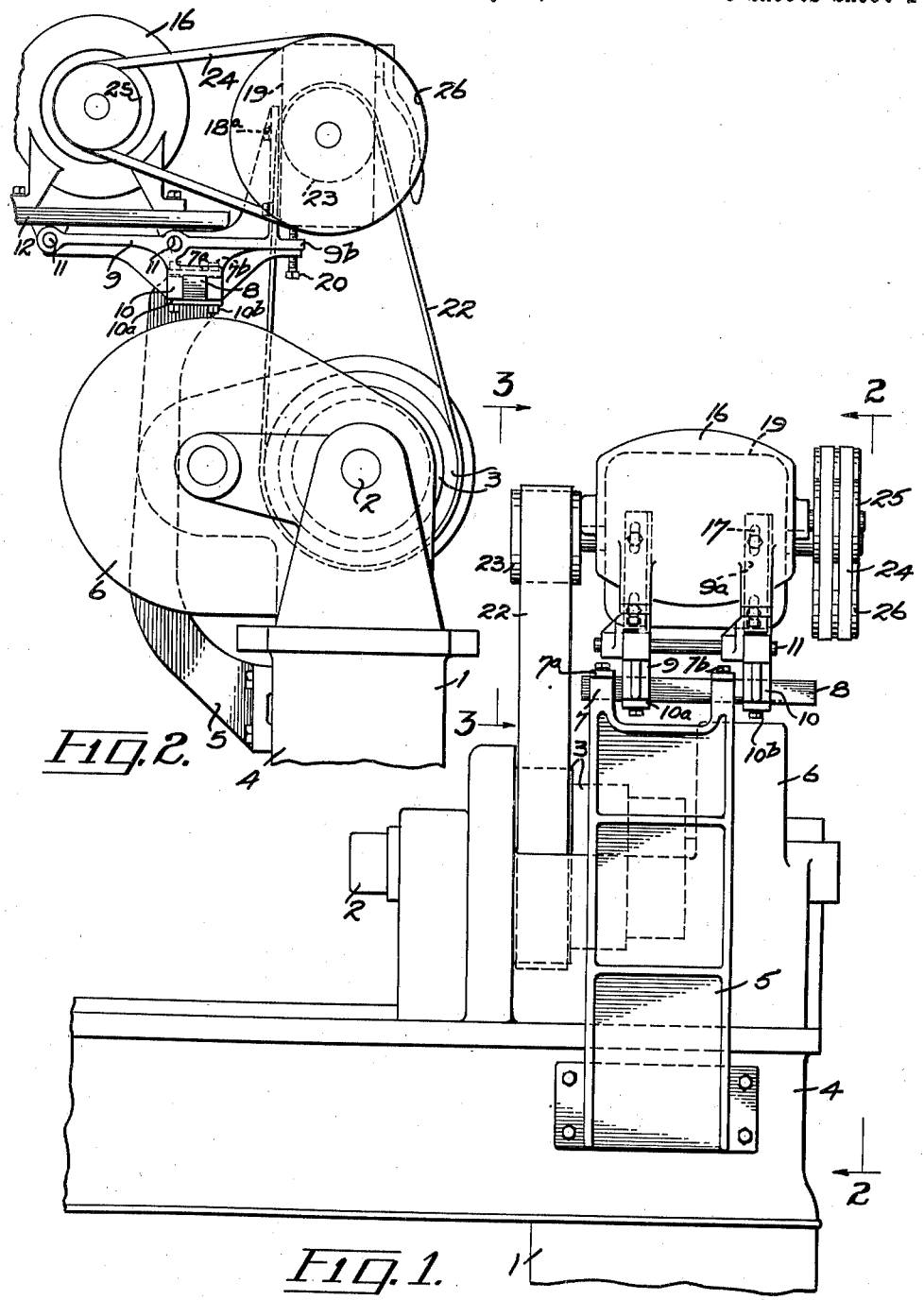

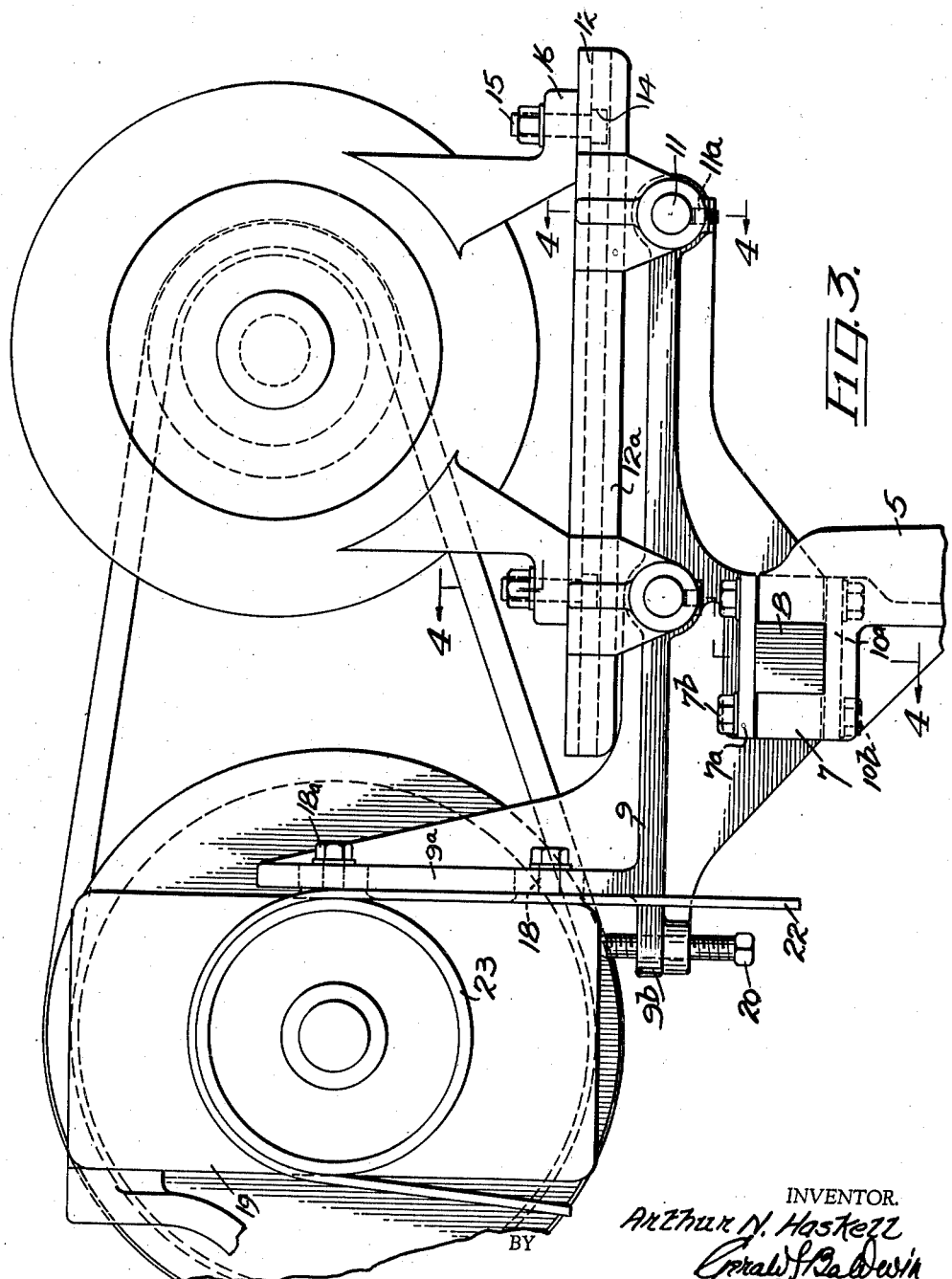

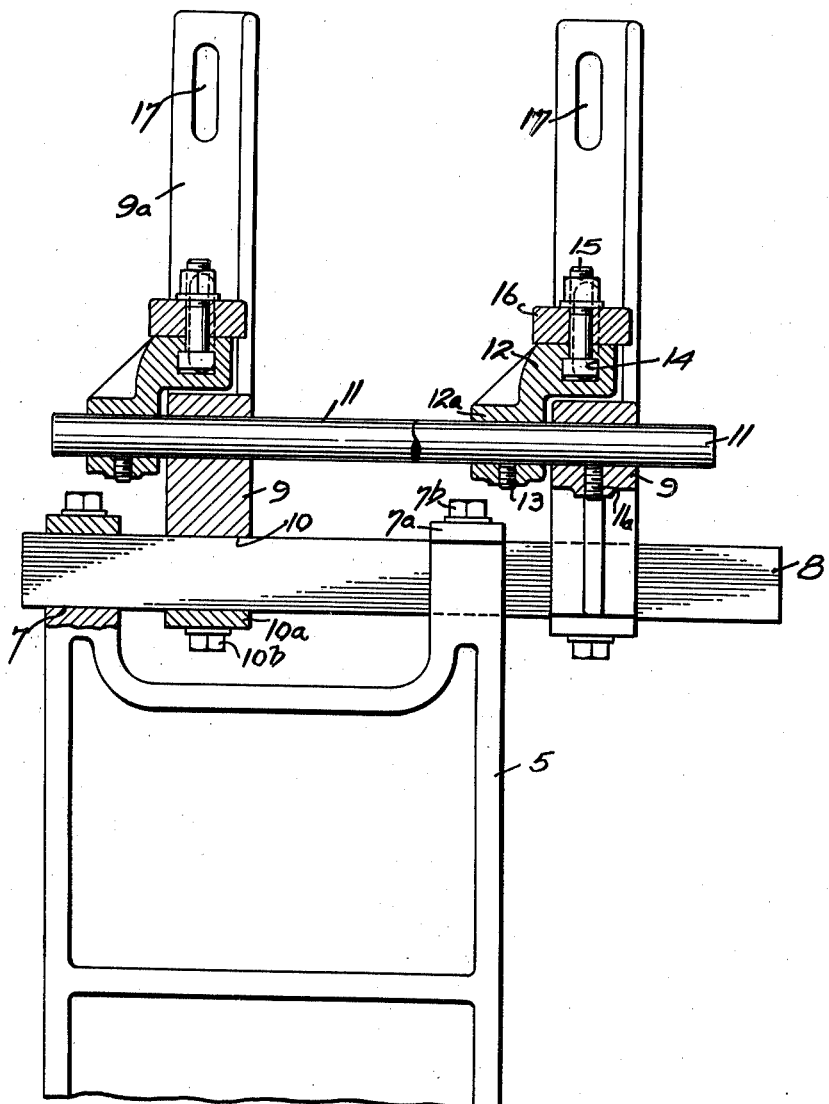

2,237,555

UNITED STATES PATENT OFFICE 2,237,555

DRIVE UNIT MOUNTING

Arthur N. Haskell, Detroit, Mich.

Application May 15, 1940, Serial No. 335,374

9 Claims. (Cl. 74—242.13)

This invention relates to improvements in drive unit mountings, and refers particularly to such mountings intended for use upon lathes, automatic screw machines, and a vast range of other machinery for which individual drives are required.

It is an object of the invention to provide a drive unit mounting so constructed that the motor and gear box thereon may be moved either independently or together upon a bracket secured to the frame of the machine to be driven, and wherein the arrangement is such that both the motor and the gear box are rigidly held in their desired positions. Thus I provide a mounting including a bracket which may be positioned to clear back gearing and other lateral portions of the machine, whereon the gear box may be aligned to drive the desired cone pulley on the machine, and the motor correctly placed relative to the gear box for driving the latter.

Another object of the invention is to provide such a drive unit mounting including a bracket, a horizontal bar supported thereby parallel with the axis of the machine spindle, and spaced carriers for the gear box and the motor which are longitudinally movably on the bar so that the gear box may be readily adjusted to align its pulley with the cone pulley on the machine to be driven; wherein the spacing of the carriers may be adjusted to suit the width of the gear box to be employed upon the mounting; and wherein supporting rods extend between and beyond the carriers on which rails are so arranged that their spacing may be varied to suit the size of the motor to be utilized upon the drive unit.

A further object of the invention is to provide such a drive unit mounting having means thereon for adjusting the distance of the gear box pulley axis from the axis of the pulley on the machine, this means being so arranged that the gear box is rigidly held at all adjusted positions, and also having means thereon for adjusting the motor relative to the gear box so that the former is also rigidly held at all adjusted positions.

Yet another object of the invention is to provide a drive unit mounting which is relatively cheap and simple to manufacture, easy to install, and which can be utilized to support a number of different sized gear boxes and motors.

Having thus briefly and broadly stated some of the objects and advantages of the invention I will now proceed to describe a preferred embodiment thereof with the aid of the accompanying drawings, in which:

Figure 1 illustrates a portion of a machine to which the invention is applied.

Figure 2 is a side view on the line 2—2 of Figure 1.

Figure 3 is an enlarged view on the line 3—3 of Figure 1, and

Figure 4 is a section on the line 4—4 of Figure 3.

Referring to the drawings, 1 designates a portion of a machine having a spindle 2 driven through any one of a set of cone pulleys 3. Secured to the frame 4 of the machine is bracket 5 which is spaced to clear back gearing and terminates in aligned bearings 7 which support a horizontal bar 8, preferably of non-circular cross section. This bar may be longitudinally adjusted when screws 7b holding caps 7a upon the said bearings are loosened. Two angle-shaped carriers 9, which are provided with bearings 10 to seat upon the bar 8, are held immovable upon the latter by bearing plates 10a, so that by loosening screws 10b which hold them in position the carriers may be moved longitudinally along the bar 8, either to change their spacing from one another, or to vary the spacing of the two carriers relative to the bearings 7 of the bracket 5.

11 denotes two supporting rods which extend transversely between, and outward beyond, the carriers 9 parallel to the bar 8. In threaded engagement with the carriers 9 are set screws 11a which, when tightened, hold the rods against axial movement relative to the carriers. Mounted upon the support rods 11, and disposed at right angles to them, are the lower portions 12a of two parallel rails 12 the spacing between which may be varied by moving either or both of them axially upon the rods; and 13 denotes set screws for holding the said lower rail portions 12a immovable upon the rods 11. The upper portions of the rails 12 are laterally offset relative to their lower portions 12a, and are provided with suitable means, such as conventional T-slots 14 having bolts 15 therein which extend upwardly through the base of a motor 16, for securing the latter thereon by nuts 15a. By offsetting the upper portions of the rails 12 relative to their lower portions the former may be positioned directly over the carriers 9, and this offset condition also permits greater variation in the transverse distance between the upper portions of the rails to accommodate motors of different sizes, for a given length of support rods 11. For instance the left hand rail 12 shown in Figure 4 may be removed and replaced so that its upper portion projects laterally outward instead of inward as shown, thereby materially increasing its distance from the other rail.

The outer faces 9a of the angle-shaped carriers 9, which in the instance shown are vertically disposed, are longitudinally slotted at 17 for the passage of studs 18 extending from a gear box 19 so that by tightening nuts 18a on the said studs the box may be securely held against the faces 9a. Set screws 20 in threaded engagement with flanges 9b provided on the carriers 9 also bear against the gear box 19 and provide means for adjusting the latter vertically, when the nuts 18a have been loosened, to tighten the belt 22 which passes around a driving pulley 23 on the gear box and also around one of the cone pulleys 3. 24 denotes V-belts which pass around a pulley 25 on the motor 16 and also around a driven pulley 26 on the gear box 19.

From the foregoing it will be clearly seen that, due to the mounting of the two carriers 9 upon the bar 8, these carriers, held in spaced relation to one another by the supporting rods 11, may be moved along the bar to align the gear box driving pulley 23 with any one of the cone pulleys 3. The spacing of the carriers 9 may be adjusted to support any width of gear box 19, and the position and spacing of the rails 12 may be adjusted to suit the width of the motor 16 employed thereon, and also to align the motor pulley 25 with the driven pulley 26 on the gear box. Provision is also made for tightening the belt 22 by adjusting the set screws 20, and for tightening the V-belts 24 by moving the motor 16 along the rails 12 and shifting the bolts 15 along their T-slots 14.

While in the foregoing the preferred construction of the invention has been described and shown, it is understood that alterations and modifications may be made thereto, provided these alterations and modifications fall within the scope of the appended claims.

What I claim is:

1. An arrangement of the character described comprising a bracket for attachment to the frame of a machine, the latter having a spindle with at least one pulley thereon, a longitudinally adjustable bar parallel with the axis of said spindle supported by the bracket, carrier means on the bar, a gear box supported by the carrier means having a driving pulley thereon in alignment with the first named pulley and a driven means thereon, rail mounting means supported by the carrier means, rails mounted thereon, and a motor supported by said rails, said motor having a driving means cooperable with said driven means.

2. An arrangement of the character described comprising the combination set forth in claim 1, wherein the means on which the rails are mounted include means whereby the rails are supported for adjustment longitudinally of the bar to align the motor driving means with said driven means.

3. An arrangement of the character described comprising the combination set forth in claim 1, wherein the means on which the rails are mounted include means whereby the rails are supported for independent adjustment longitudinally of the bar to vary their spacing to accommodate differently sized motors.

4. An arrangement of the character described comprising a bracket for attachment to the frame of a machine, the latter having a spindle with at least one pulley thereon, a bar carried by the bracket, said bar being parallel with the spindle axis, separate carriers independently adjustable longitudinally of the bar, a gear box supported by the carriers having a driving pulley in alignment with the first named pulley and a driven means thereon, rail supporting means mounted on the carriers, rails supported thereby for adjustment parallel with the bar, and a motor supported by said rails, said motor having a driving means cooperable with the driven means.

5. An arrangement of the character described comprising the combination set forth in claim 4, wherein the means on the carriers supporting the rails includes means for adjustment of the spacing of the rails.

6. An arrangement of the character described comprising a bracket for attachment to the frame of a machine, the latter having a spindle with cone pulleys thereon, a bar parallel with the spindle axis carried by the bracket, two angle-shaped carriers mounted on the bar for independent adjustment therealong, a gear box having a driving and a driven pulley thereon mounted on the outer side of one angular portion of each carrier, said driving pulley being aligned with one of the cone pulleys, means for adjusting the gear box upon its angular carrier portions to vary the spacing between the axes of the cone pulleys and the driving pulley, means mounted on the other angular carrier portions supporting parallel rails for adjustment parallel with the bar, and a motor mounted on said rails having a driving pulley in alignment with the driven gear box pulley.

7. An arrangement of the character described comprising the combination set forth in claim 6, wherein the means supporting the rails consist of rods each extending through both carriers, said rails being vertically offset to permit their upper portions to extend longitudinally over the portions of the carriers by which the rods are supported.

8. An arrangement of the class described comprising a bracket for attachment to the frame of a machine, a bar supported by the bracket and adjustable longitudinally, an angular carrier member mounted on said bar for adjustable movement therealong, a rail supporting member positioned on one angular portion of the carrier and extending in parallelism with said bar, a motor supporting rail carried thereby and movable therealong, a motor adjustably supported by said rail, and a gear box supported by the other angular portion of said carrier member and movable with reference thereto in a plane angular with respect to the plane of movement of the motor.

9. An arrangement of the class described comprising a bracket for attachment to the frame of a machine, a bar supported by the bracket and adjustable longitudinally, an angular carrier member mounted on said bar for adjustable movement therealong, a rail supporting member positioned on one angular portion of the carrier and extending in parallelism with said bar, said member being movable lengthwise and adjustable with reference to the carrier member, a motor supporting rail carried thereby and movable therealong, a motor adjustably supported by said rail, a gear box supported by the other angular portion of said carrier member and movable with reference thereto in a plane angular with respect to the plane of movement of the motor, and means on the carrier cooperable with said gear box for moving the same.

ARTHUR N. HASKELL.